United States Patent
Park et al.

(10) Patent No.: US 9,532,278 B2
(45) Date of Patent: Dec. 27, 2016

(54) METHOD AND APPARATUS FOR TRANSMITTING ESTABLISHMENT CAUSE VALUE IN WIRELESS COMMUNICATION SYSTEM

(71) Applicant: LG ELECTRONICS INC., Seoul (KR)

(72) Inventors: Kyung Min Park, Anyang-si (KR); Jin Sook Ryu, Anyang-si (KR); Dae Wook Byun, Anyang-si (KR); Jian Xu, Anyang-si (KR); Young Dae Lee, Anyang-si (KR); Sung Hoon Jung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 297 days.

(21) Appl. No.: 14/239,856

(22) PCT Filed: Sep. 28, 2012

(86) PCT No.: PCT/KR2012/007937
§ 371 (c)(1),
(2) Date: Feb. 20, 2014

(87) PCT Pub. No.: WO2013/048193
PCT Pub. Date: Apr. 4, 2013

(65) Prior Publication Data
US 2014/0213264 A1 Jul. 31, 2014

Related U.S. Application Data

(60) Provisional application No. 61/539,990, filed on Sep. 28, 2011.

(51) Int. Cl.
*H04W 36/00* (2009.01)
*H04W 88/08* (2009.01)

(52) U.S. Cl.
CPC ..... *H04W 36/0072* (2013.01); *H04W 36/0055* (2013.01); *H04W 88/08* (2013.01)

(58) Field of Classification Search
CPC ............... H04W 36/0055; H04W 36/0072; H04W 88/08
USPC .............. 455/411–414.2, 418–421, 435.1–453,455/456.1–457; 370/328–332, 338, 444
See application file for complete search history.

(56) References Cited

U.S. PATENT DOCUMENTS

| | | | | |
|---|---|---|---|---|
| 8,526,953 B2* | 9/2013 | Alanara | ................ | H04W 12/06 370/331 |
| 8,954,078 B2* | 2/2015 | Van Phan | ............. | H04W 36/08 370/335 |
| 8,983,532 B2* | 3/2015 | Arzelier | ........................ | 370/328 |
| 2008/0019320 A1* | 1/2008 | Phan | ..................... | H04W 36/02 370/331 |
| 2008/0123596 A1 | 5/2008 | Gallagher et al. | | |
| 2009/0061877 A1 | 3/2009 | Gallagher et al. | | |

(Continued)

*Primary Examiner* — Babar Sarwar
(74) *Attorney, Agent, or Firm* — Lee, Hong, Degerman, Kang & Waimey

(57) ABSTRACT

A method and apparatus of performing a handover procedure in a wireless communication system is provided. The target eNodeB (eNB) receives a specific establishment cause of a user equipment (UE). The specific establishment cause among a plurality of establishment causes comprises emergency, high priority access, mobile terminated access, mobile oriented signaling, mobile oriented data, and delay tolerant access. The target eNB transmits a handover command message to the UE after receiving the specific establishment cause.

8 Claims, 11 Drawing Sheets

(56) References Cited

U.S. PATENT DOCUMENTS

| | | | |
|---|---|---|---|
| 2009/0061879 A9 | 3/2009 | Gallagher et al. | |
| 2009/0175163 A1* | 7/2009 | Sammour | H04L 1/1685 370/216 |
| 2010/0178920 A1* | 7/2010 | Kitazoe | H04W 36/0055 455/436 |
| 2010/0189071 A1* | 7/2010 | Kitazoe | H04W 74/002 370/331 |
| 2011/0002306 A1* | 1/2011 | Liu | H04W 36/0033 370/331 |
| 2011/0117905 A1* | 5/2011 | Huang | H04W 76/028 455/422.1 |
| 2011/0171924 A1* | 7/2011 | Faccin | H04W 4/22 455/404.1 |
| 2011/0171926 A1* | 7/2011 | Faccin | H04W 48/18 455/404.1 |
| 2011/0188416 A1* | 8/2011 | Faccin | H04W 76/02 370/310 |
| 2011/0189971 A1* | 8/2011 | Faccin | H04W 76/02 455/404.1 |
| 2011/0201279 A1 | 8/2011 | Suzuki et al. | |
| 2013/0040597 A1* | 2/2013 | Jang | H04W 48/02 455/404.1 |

* cited by examiner

FIG. 3
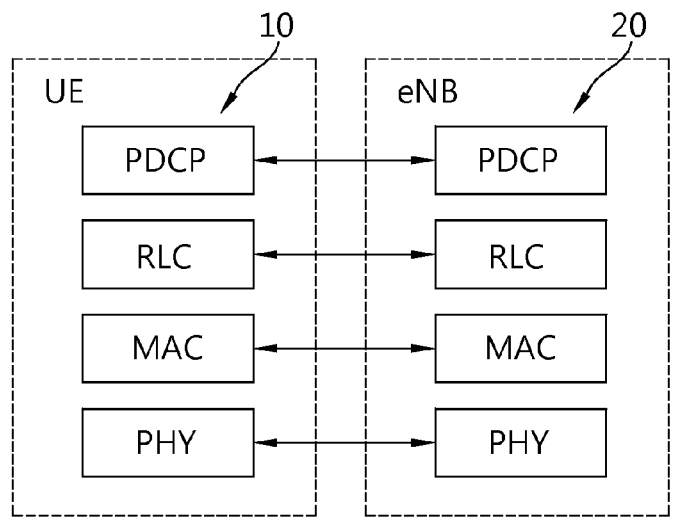
(a)
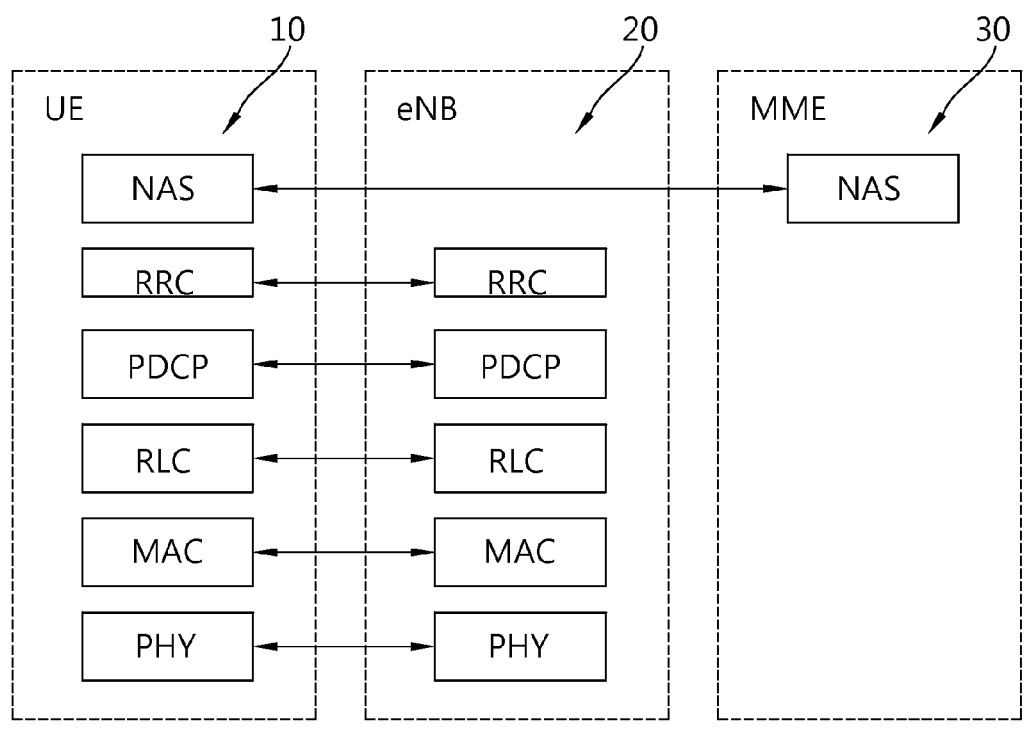
(b)

METHOD AND APPARATUS FOR TRANSMITTING ESTABLISHMENT CAUSE VALUE IN WIRELESS COMMUNICATION SYSTEM

CROSS-REFERENCE TO RELATED APPLICATIONS

This application is the National Stage filing under 35 U.S.C. 371 of International Application No. PCT/KR2012/007937, filed on Sep. 28, 2012, which claims the benefit of U.S. Provisional Application No. 61/539,990, filed on Sep. 28, 2011, the contents of which are all hereby incorporated by reference herein in their entirety.

BACKGROUND OF THE INVENTION

Field of the Invention

The present invention relates to wireless communication, and more particularly, to a method and apparatus for transmitting an establishment cause value in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

FIG. 1 shows network structure of an evolved universal mobile telecommunication system (E-UMTS). The E-UMTS may be also referred to as an LTE system. The communication network is widely deployed to provide a variety of communication services such as voice over internet protocol (VoIP) through IMS and packet data.

As illustrated in FIG. 1, the E-UMTS network includes an evolved UMTS terrestrial radio access network (E-UTRAN), an evolved packet core (EPC) and one or more user equipment. The E-UTRAN may include one or more evolved NodeB (eNB) 20, and a plurality of user equipment (UE) 10. One or more E-UTRAN mobility management entity (MME)/system architecture evolution (SAE) gateways (S-GW) 30 may be positioned at the end of the network and connected to an external network.

As used herein, "downlink" refers to communication from eNB 20 to UE 10, and "uplink" refers to communication from the UE to an eNB. UE 10 refers to communication equipment carried by a user and may be also referred to as a mobile station (MS), a user terminal (UT), a subscriber station (SS) or a wireless device.

An eNB 20 provides end points of a user plane and a control plane to the UE 10. MME/S-GW 30 provides an end point of a session and mobility management function for UE 10. The eNB and MME/S-GW may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including non-access stratum (NAS) signaling to eNBs 20, NAS signaling security, access stratum (AS) security control, Inter core network (CN) node signaling for mobility between 3GPP access networks, Idle mode UE reachability (including control and execution of paging retransmission), tracking area list management (for UE in idle and active mode), packet data network (PDN) GW and serving GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g. deep packet inspection), lawful interception, UE internet protocol (IP) address allocation, transport level packet marking in the downlink, UL and DL service level charging, gating and rate enforcement, DL rate enforcement based on APN-AMBR. For clarity MME/S-GW 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

FIG. 2 shows architecture of a typical E-UTRAN and a typical EPC.

As illustrated, eNB 20 may perform functions of selection for gateway 30, routing toward the gateway during a radio resource control (RRC) activation, scheduling and transmitting of paging messages, scheduling and transmitting of broadcast channel (BCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a user-plane protocol and a control-plane protocol stack for the E-UMTS.

FIG. 3(a) is block diagram depicting the user-plane protocol, and FIG. 3(b) is block diagram depicting the control-plane protocol. As illustrated, the protocol layers may be divided into a first layer (L1), a second layer (L2) and a third layer (L3) based upon the three lower layers of an open system interconnection (OSI) standard model that is well known in the art of communication systems.

The physical layer, the L1, provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of the L2 provides services to a radio link control (RLC) layer (which is a higher layer) via a logical channel. The RLC layer of the L2 supports the transmission of data with reliability. It should be noted that the RLC layer illustrated in FIGS. 3(a) and 3(b) is depicted because if the RLC functions are implemented in and performed by the MAC layer, the RLC layer itself is not required. A packet data convergence protocol (PDCP) layer of the L2 performs a header compression function that reduces unnecessary control information such that data being transmitted by employing IP packets, such as IPv4 or IPv6, can be efficiently sent over a radio (wireless) interface that has a relatively small bandwidth.

A radio resource control (RRC) layer located at the lowest portion of the L3 is only defined in the control plane and controls logical channels, transport channels and the physical channels in relation to the configuration, reconfiguration, and release of the radio bearers (RBs). Here, the RB signifies a service provided by the L2 for data transmission between the terminal and the UTRAN.

As illustrated in FIG. 3(a), the RLC and MAC layers (terminated in an eNB 20 on the network side) may perform functions such as scheduling, automatic repeat request (ARQ), and hybrid automatic repeat request (HARQ). The PDCP layer (terminated in eNB 20 on the network side) may perform the user plane functions such as header compression, integrity protection, and ciphering.

As illustrated in FIG. 3(b), the RLC and MAC layers (terminated in an eNodeB 20 on the network side) perform the same functions for the control plane. As illustrated, the RRC layer (terminated in an eNB 20 on the network side) may perform functions such as broadcasting, paging, RRC connection management, RB control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC state may be divided into two different states such as a RRC_IDLE and a RRC_CONNECTED. In RRC_IDLE state, the UE 10 may receive broadcasts of system information and paging information while the UE specifies a discontinuous reception (DRX) configured by NAS, and the UE has been allocated an identification (ID) which uniquely identifies the UE in a tracking area and may perform PLMN selection and cell re-selection. Also, in RRC_IDLE state, no RRC context is stored in the eNB.

In RRC_CONNECTED state, the UE 10 has an E-UTRAN RRC connection and a context in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE 10 specifies the paging DRX cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

FIG. 4 shows an example of structure of a physical channel.

The physical channel transfers signaling and data between layer L1 of a UE and eNB. As illustrated in FIG. 4, the physical channel transfers the signaling and data with a radio resource, which consists of one or more sub-carriers in frequency and one more symbols in time.

One sub-frame, which is 1 ms in length, consists of several symbols. The particular symbol(s) of the sub-frame, such as the first symbol of the sub-frame, can be used for downlink control channel (PDCCH). PDCCHs carry dynamic allocated resources, such as PRBs and modulation and coding scheme (MCS).

A transport channel transfers signaling and data between the L1 and MAC layers. A physical channel is mapped to a transport channel.

Downlink transport channel types include a broadcast channel (BCH), a downlink shared channel (DL-SCH), a paging channel (PCH) and a multicast channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming. The PCH is used for paging a UE. The MCH is used for multicast or broadcast service transmission.

Uplink transport channel types include an uplink shared channel (UL-SCH) and random access channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include a DCCH that can be mapped to UL-SCH, a DTCH that can be mapped to UL-SCH and a CCCH that can be mapped to UL-SCH. Downlink connections between logical channels and transport channels include a BCCH that can be mapped to BCH or DL-SCH, a PCCH that can be mapped to PCH, a DCCH that can be mapped to DL-SCH, and a DTCH that can be mapped to DL-SCH, a MCCH that can be mapped to MCH, and a MTCH that can be mapped to MCH.

In E-UTRAN, a handover procedure may be performed. In current handover procedure, there is no way no use an establishment cause of a UE. However, for efficient handover procedure, there is required that the establishment cause of the UE needs to be used for the handover procedure.

SUMMARY OF THE INVENTION

The present invention provides a method and apparatus for transmitting an establishment cause value in a wireless communication system. The present invention provides a method for obtaining, by a target eNodeB (eNB), information on a user equipment (UE)'s establishment cause value in a handover procedure.

In an aspect, a method of performing a handover procedure, by a target base station, in a wireless communication system is provided. The method includes receiving a specific establishment cause of a user equipment (UE), the specific establishment cause among a plurality of establishment causes comprising emergency, high priority access, mobile terminated access, mobile oriented signaling, mobile oriented data, and delay tolerant access, and transmitting a handover command message to the UE after receiving the specific establishment cause.

In another aspect, a method of performing a handover procedure, by a mobility management entity (MME) in a wireless communication system is provided. The method includes receiving a path switch request message from a target base station, and transmitting a path switch request acknowledged message including a specific establishment cause of a user equipment (UE) to the target base station, the specific establishment cause among a plurality of establishment causes comprising emergency, high priority access, mobile terminated access, mobile oriented signaling, mobile oriented data, and delay tolerant access.

In another aspect, a target base station in a wireless communication system is provided. The target base station includes a radio frequency (RF) unit for transmitting or receiving a radio signal, and a processor, operatively coupled to the RF unit and configured to receive a specific establishment cause of a user equipment (UE), the specific establishment cause among a plurality of establishment causes comprising emergency, high priority access, mobile terminated access, mobile oriented signaling, mobile oriented data, and delay tolerant access, and transmit a handover command message to the UE after receiving the specific establishment cause.

Effective handover procedure can be performed.

BRIEF DESCRIPTION OF THE DRAWINGS

FIG. 3 shows a user-plane protocol and a control-plane protocol stack for the E-UMTS.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
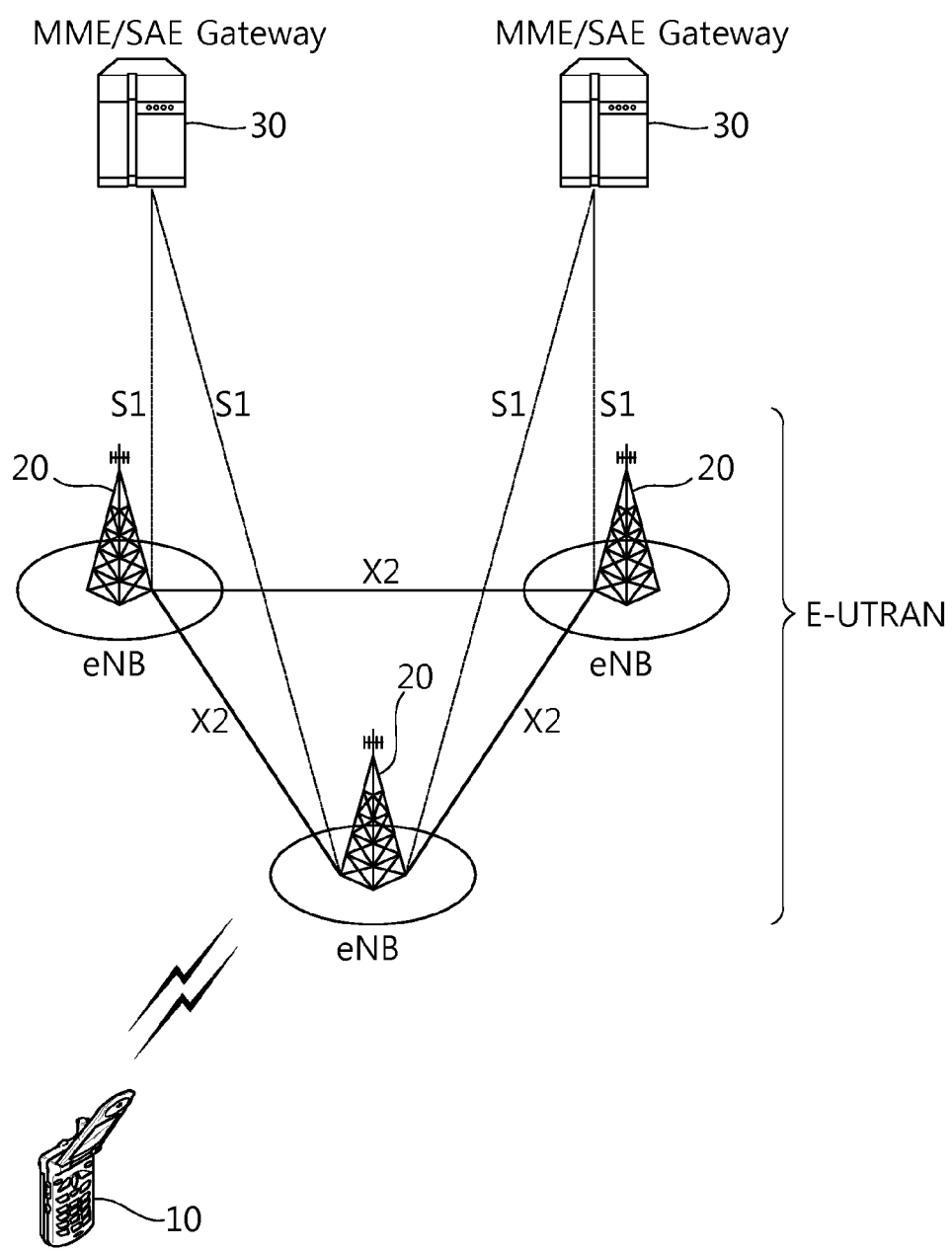
FIG. 1 shows network structure of an evolved universal mobile telecommunication system (E-UMTS).
Figure 2:
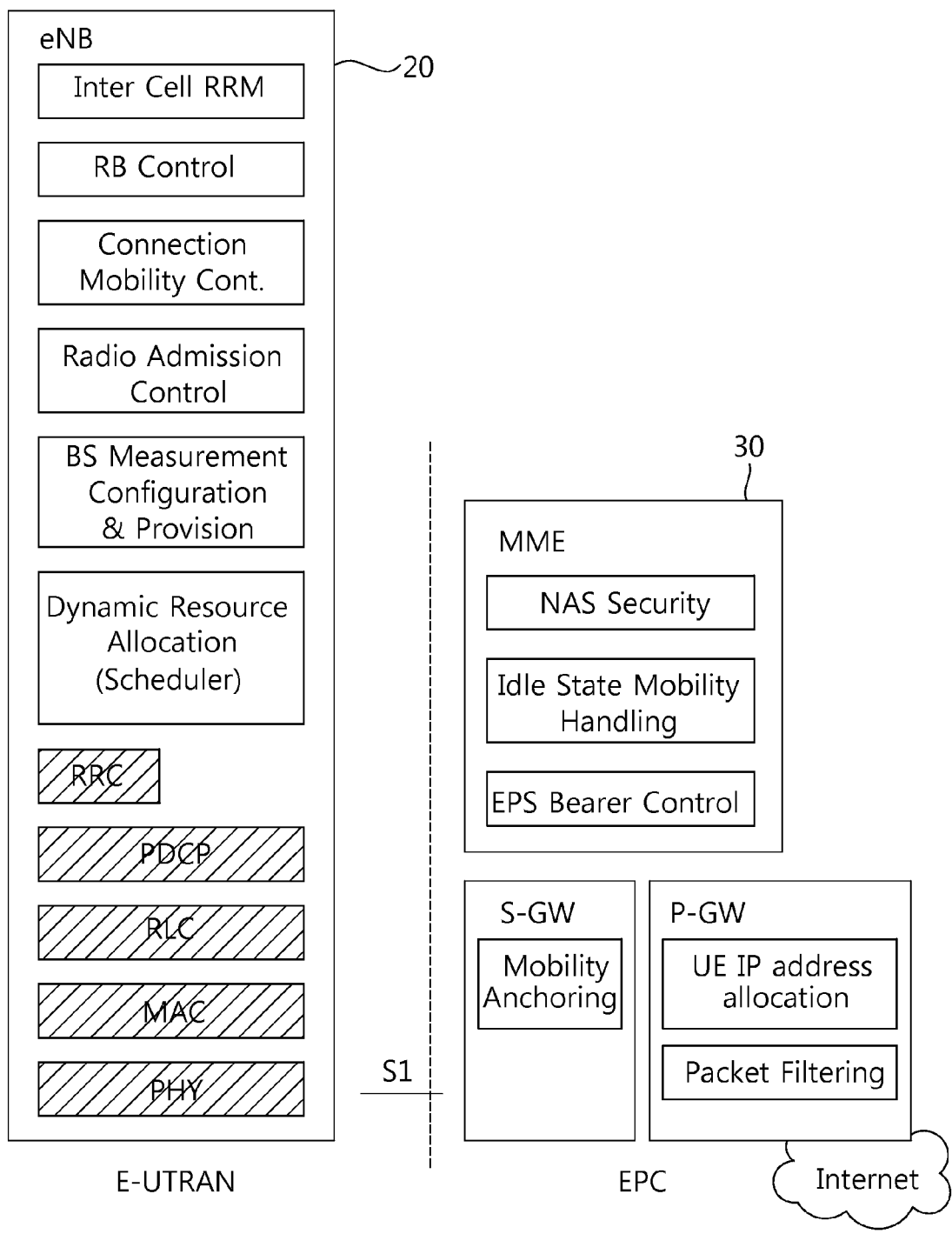
FIG. 2 shows architecture of a typical E-UTRAN and a typical EPC.
Figure 4:
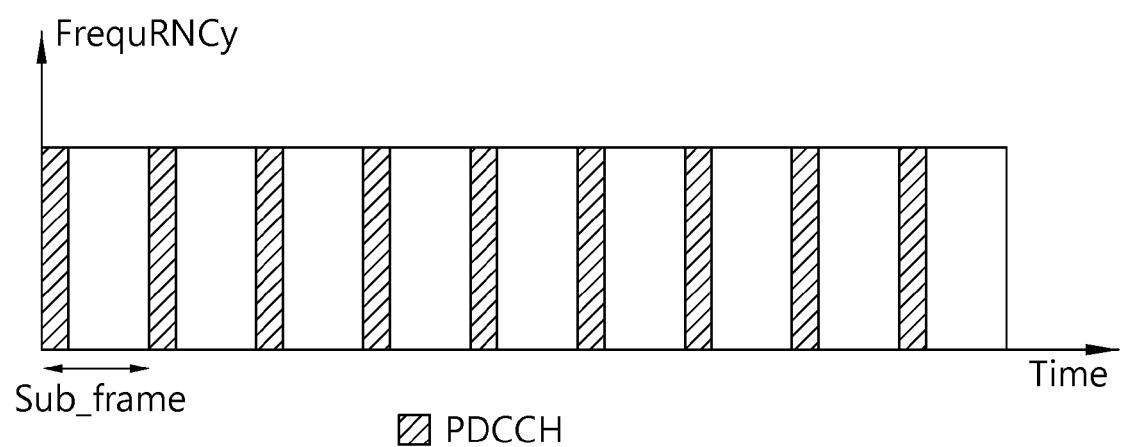
FIG. 4 shows an example of structure of a physical channel.
Figure 5:
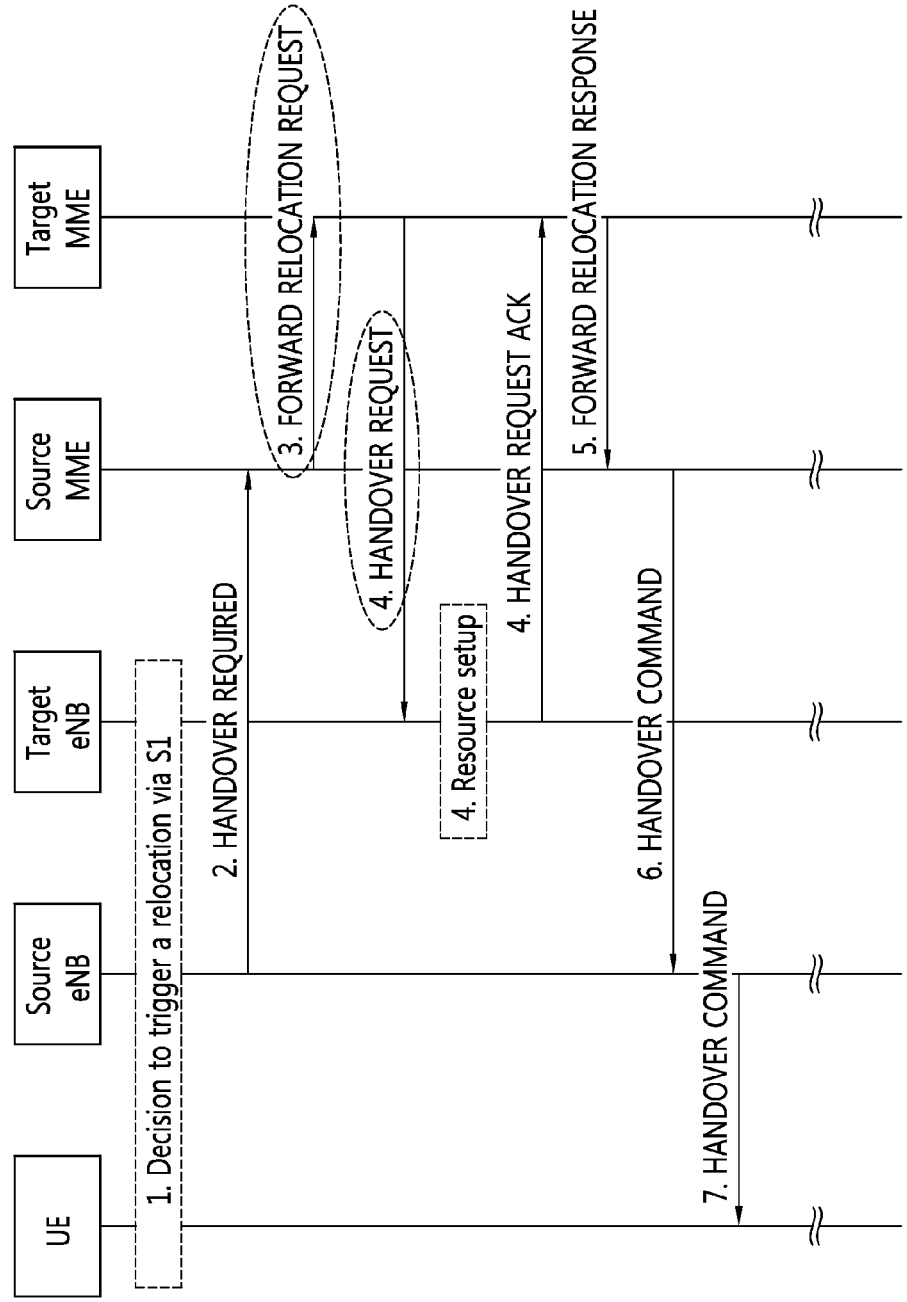
FIG. 5 shows an example of an S1 interface based handover procedure.

FIG. 5 shows an example of an S1 interface based handover procedure. It may be referred to Paragraph 5.5.1.2.2 of 3GPP (3rd generation partnership project) TS 23.401 V10.2.0 (2010 December).

The S1-based handover procedure is used when the X2-based handover cannot be used. The source eNB initiates a handover by sending a handover required message over the S1-MME reference point. This procedure may relocate the MME and/or the S-GW. The source MME selects the target MME. The MME should not be relocated during inter-eNB handover unless the UE leaves the MME pool area where the UE is served. The MME (target MME for MME relocation) determines if the S-GW needs to be relocated. If the S-GW needs to be relocated, the MME selects the target S-GW.

The source eNB decides which of the EPS bearers are subject for forwarding of downlink and optionally also uplink data packets from the source eNB to the target eNB. The EPC does not change the decisions taken by the RAN node. Packet forwarding can take place either directly from the source eNB to the target eNB, or indirectly from the source eNB to the target eNB via the source and target S-GWs.

The availability of a direct forwarding path is determined in the source eNB and indicated to the source MME. If X2 connectivity is available between the source and target eNBs, a direct forwarding path is available.

If a direct forwarding path is not available, indirect forwarding may be used. The source MME uses the indication from the source eNB to determine whether to apply indirect forwarding. The source MME indicates to the target MME whether indirect forwarding should apply. Based on this indication, the target MME determines whether it applies indirect forwarding.

1. The source eNB decides to initiate an S1-based handover to the target eNB. This can be triggered e.g. by no X2 connectivity to the target eNB, or by an error indication from the target eNB after an unsuccessful X2-based handover, or by dynamic information learnt by the source eNB.

2. The source eNB transmits a handover required message to the source MME. The handover required message may include direct forwarding path availability, source to target transparent container, target eNB identity, closes subscriber group (CSG) identity (ID), CSG access mode, target tracking area identity (TAI), S1AP cause. The source eNB indicates which bearers are subject to data forwarding. Direct forwarding path availability indicates whether direct forwarding is available from the source eNB to the target eNB. This indication from source eNB can be based on e.g. the presence of X2. The target TAI is transmitted to MME to facilitate the selection of a suitable target MME. When the target cell is a CSG cell or a hybrid cell, the source eNB shall include the CSG ID of the target cell. If the target cell is a hybrid cell, the CSG access mode shall be indicated.

3. The source MME selects the target MME and if it has determined to relocate the MME, it transmits a forward relocation request message to the target MME. The forward relocation request message may include MME UE context, source to target transparent container, radio access network (RAN) cause, target eNB identity, CSG ID, CSG membership indication, target TAI, MS info change reporting action (if available), CSG information reporting action (if available), UE time zone, direct forwarding flag. The target TAI is transmitted to the target MME to help it to determine whether S-GW relocation is needed.

The source MME shall perform access control by checking the UE's CSG subscription when CSG ID is provided by the source eNB. If there is no subscription data for this CSG ID or the CSG subscription is expired, and the target cell is a CSG cell, the source MME shall reject the handover with an appropriate cause.

The MME UE context includes international mobile subscriber identity (IMSI), ME identity, UE security context, UE network capability, AMBR, selected CN operator ID, APN restriction, S-GW address and TEID for control signalling, and EPS Bearer context(s).

An EPS bearer context includes the PDN GW addresses and TEIDs (for GTP-based S5/S8) or GRE keys (for PMIP-based S5/S8) at the PDN GW(s) for uplink traffic, APN, S-GW addresses and TEIDs for uplink traffic, and TI.

RAN cause indicates the S1AP cause as received from source eNB.

The source MME includes the CSG ID in the forward relocation request message when the target cell is a CSG or hybrid cell. When the target cell is a hybrid cell, the CSG membership indication indicating whether the UE is a CSG member shall be included in the Forward Relocation Request message.

The direct forwarding flag indicates if direct forwarding is applied, or if indirect forwarding is going to be set up by the source side.

The target MME shall determine the maximum APN restriction based on the APN restriction of each bearer context in the forward relocation request message, and shall subsequently store the new maximum APN restriction value.

4. The target MME transmits a handover request message to the target eNB. The handover request message may include EPS bearers to setup, AMBR, S1AP cause, source to target transparent container, CSG ID, CSG membership indication, handover restriction list. This message creates the UE context in the target eNB, including information about the bearers, and the security context. For each EPS bearer, the bearers to setup includes S-GW address and uplink TEID for user plane, and EPS Bearer quality of service (QoS). If the direct forwarding flag indicates unavailability of direct forwarding and the target MME knows that there is no indirect data forwarding connectivity between source and target, the bearers to setup shall include "Data forwarding not possible" indication for each EPS bearer. Handover restriction list is transmitted if available in the target MME.

S1AP cause indicates the RAN cause as received from the source MME.

The target MME shall include the CSG ID and CSG membership indication when provided by the source MME in the forward relocation request message.

The target eNB performs a resource setup, and transmits a handover request acknowledge message to the target MME. The handover request message may include EPS bearer setup list, EPS bearers failed to setup list, target to source transparent container. The EPS bearer setup list includes a list of addresses and TEIDs allocated at the target eNB for downlink traffic on S1-U reference point (one TEID per bearer) and addresses and TEIDs for receiving forwarded data if necessary. If the UE-AMBR is changed, e.g. all the EPS bearers which are associated to the same APN are rejected in the target eNB, the MME shall recalculate the new UE-AMBR and signal the modified UE-AMBR value to the target eNB.

If the target cell is a CSG cell, the target eNB shall verify the CSG ID provided by the target MME, and reject the handover with an appropriate cause if it does not match the CSG ID for the target cell. If the target eNB is in hybrid mode, it may use the CSG membership indication to perform differentiated treatment for CSG and non-CSG members.

5. If the MME has been relocated, the target MME transmits a forward relocation response message to the source MME. The forward relocation response message may include cause, target to source transparent container, S-GW change indication, EPS bearer setup list, addresses and TEIDs. For indirect forwarding, this message includes S-GW address and TEIDs for indirect forwarding (source or target). S-GW change indication indicates a new S-GW has been selected.

6. The source MME transmits a handover command message to the source eNB. The handover command message may include target to source transparent container, bearers subject to forwarding, bearers to release. The bearers subject to forwarding includes list of addresses and TEIDs allocated for forwarding. The bearers to release includes the list of bearers to be released.

7. The handover command message is constructed using the target to source transparent container and is transmitted to the UE. Upon reception of this message, the UE will remove any EPS bearers for which it did not receive the corresponding EPS radio bearers in the target cell.

Figure 6:
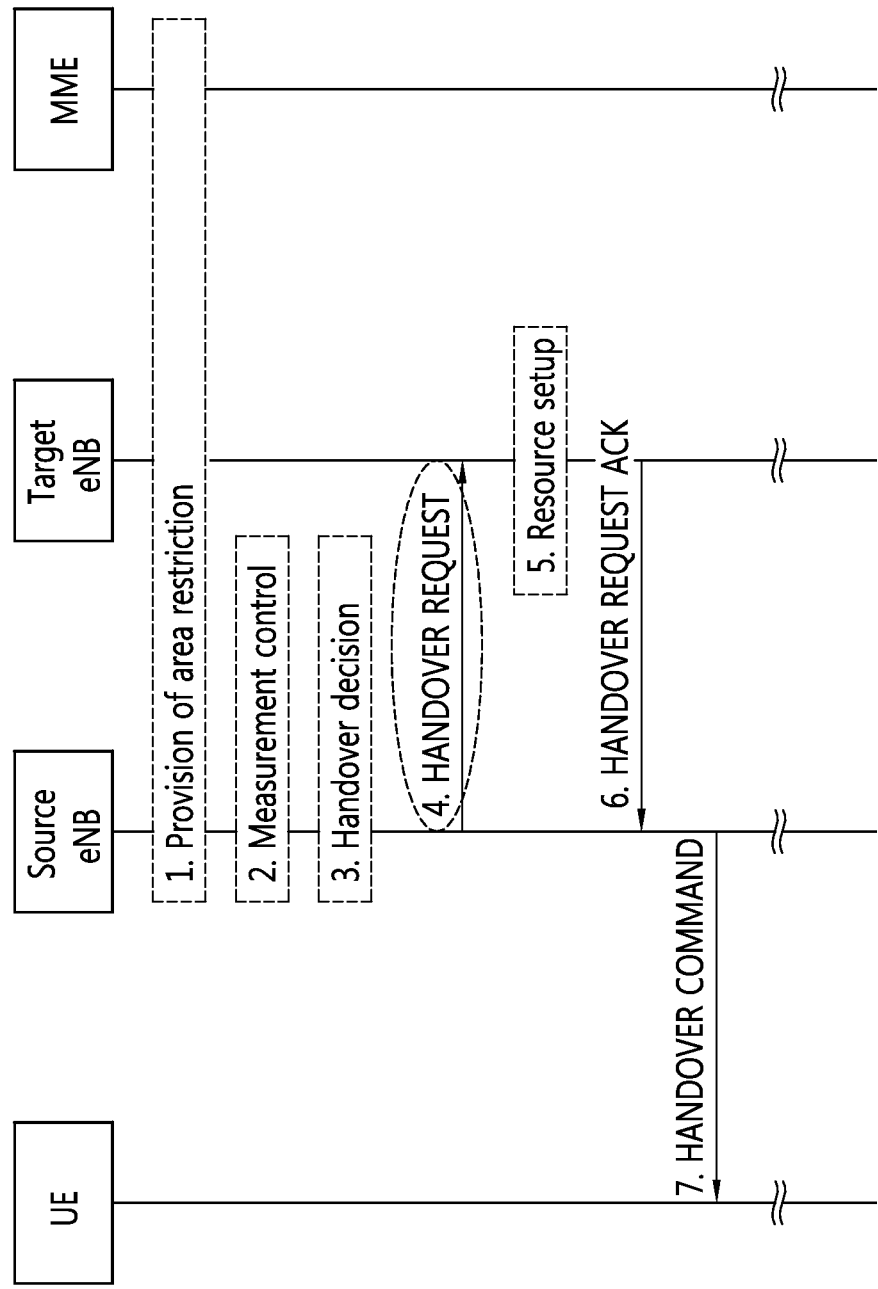
FIG. 6 shows an example of an X2 interface based handover procedure.

FIG. 6 shows an example of an X2 interface based handover procedure. It may be referred to Paragraph 10.1.2.1.1 of 3GPP TS 36.300 V10.2.0 (2010 December). FIG. 6 shows a handover preparation procedure.

1. Area restriction information is provided. The UE context within the source eNB contains information regarding roaming restrictions which where provided either at connection establishment or at the last timing advance (TA) update.

2. The source eNB configures the UE measurement procedures according to the area restriction information, and transmits a measurement control message to the UE through L3 signaling. The UE transmits measurement reports by the rules set by i.e. system information, specification etc to the source eNB through L3 signaling. Measurements provided by the source eNB may assist the function controlling the UE's connection mobility. Meanwhile, the packet data is exchanged between the UE and the source eNB, or between the source eNB and the serving gateway.

3. The source eNB makes handover decision based on the measurement reports and radio resource management (RRM) information.

4. The source eNB transmits a handover request message through L3 signaling to the target eNB passing necessary information to prepare the handover procedure at the target side. UE X2/UE S1 signaling references enable the target eNB to address the source eNB and the EPC. The evolved radio access bearer (E-RAB) context includes necessary radio network layer (RNL) and transport network layer (TNL) addressing information, and quality of service (QoS) profiles of the E-RABs.

5. The target eNB performs a resource setup.

6. The target eNB transmits a handover request acknowledge message to the source eNB through L3 signaling, and prepares the handover. The handover request acknowledge message may include a transparent container to be sent to the UE as an RRC message to perform the handover. The transparent container may include a new C-RNTI, target eNB security algorithm identifiers for the selected security algorithms, a dedicated RACH preamble, and possibly some other parameters i.e. access parameters, SIBs, etc. The handover request acknowledge message may also include RNL/TNL information for the forwarding tunnels, if necessary. Meanwhile, as soon as the source eNB receives the handover request acknowledge message, or as soon as the transmission of the handover command is initiated in the downlink, data forwarding may be initiated.

7. The source eNB transmits a handover command message to the UE.

According to the handover procedure described above, the target eNB receives the necessary information for the UE through the handover request message in S1/X2 based handover procedure. Also, in case of S1 based handover procedure, the target MME get that information through the forward relocation request message from the source MME.

Figure 7:
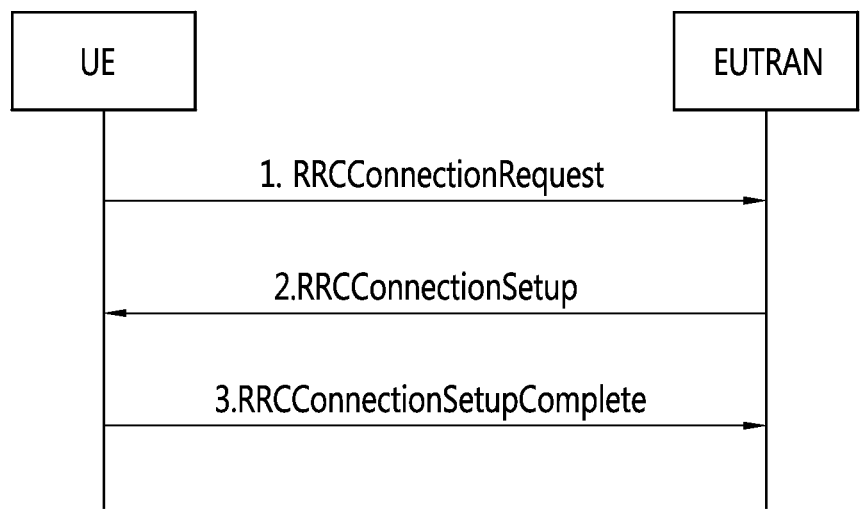
FIG. 7 shows an example of a radio resource control (RRC) connection procedure.

FIG. 7 shows an example of a radio resource control (RRC) connection procedure.

1. The UE transmits an RRC connection request message to the network. The RRC connection request message is used to request the establishment of an RRC connection. The RC connection request message may be transmitted on a common control channel (CCCH), which is a logical channel. A signaling radio bearer (RB) for the RRC connection request message may be SRB0. The RRC connection request message may be transmitted based on a transparent mode (TM). Table 1 shows an example of the RRC connection request message.

TABLE 1

| | |
|---|---|
| -- ASN1START | |
| RRCConnectionRequest ::= | SEQUENCE { |
|   criticalExtensions |   CHOICE { |
|     rrcConnectionRequest-r8 |     RRCConnectionRequest-r8-IEs, |
|     criticalExtensionsFuture |     SEQUENCE{ } |
|   } | |
| } | |
| RRCConnectionRequest-r8-IEs ::= | SEQUENCE { |
|   ue-Identity |   InitialUE-Identity, |
|   establishmentCause |   EstablishmentCause, |
|   spare |   BIT STRING (SIZE (1)) |
| } | |
| InitialUE-Identity ::= | CHOICE { |
|   s-TMSI |   S-TMSI, |
|   randomValue |   BIT STRING (SIZE (40)) |
| } | |
| EstablishmentCause ::= | ENUMERATED { |
|   mo-Signalling, |   emergency, highPriorityAccess, |
| |   mt-Access, |
|   spare1} |   mo-Data, delayTolerantAccess- |
| |   v1020, spare2, |
| -- ASN1STOP | |

Referring to Table 1, an EstablishmentCause field provides the establishment cause for the RRC connection request as provided by the upper layers. The establishment cause consists of the information about emergency, high priority access, mobile terminated (mt) access, mobile oriented (mo) signaling, mobile oriented data, and delay tolerant access. In the EstablishmentCause field. A Random-Value field indicates an integer value in the range 0 to $2^{40}-1$. A ue-Identity field indicates a UE identity included to facilitate contention resolution by lower layers.

2. The network transmits an RRC connection response message to the UE.

3. The UE transmits an RRC connection setup complete message to the network.

In current handover procedures, there is no way to transmit the establishment cause of the UE to the target eNB. It means that the target eNB is not able to know the establishment cause of the UE after the handover completion. Therefore the target eNB cannot manage the UEs in consideration of their establishment causes.

Accordingly, the proposed method of transmitting an establishment cause of a UE in a handover procedure is described below. In current 3GPP LTE rel-10, the handover request message and the forward relocation request message do not include information enough to classify and prioritize further various kinds of established UEs, e.g. emergency, highPriorityAccess, mt-Access, mo-Signalling, mo-Data, delayTolerantAccess. Therefore, a method of transmitting the establishment cause of the UE included in the handover request message or the forward relocation request message may be proposed.

Figure 8:
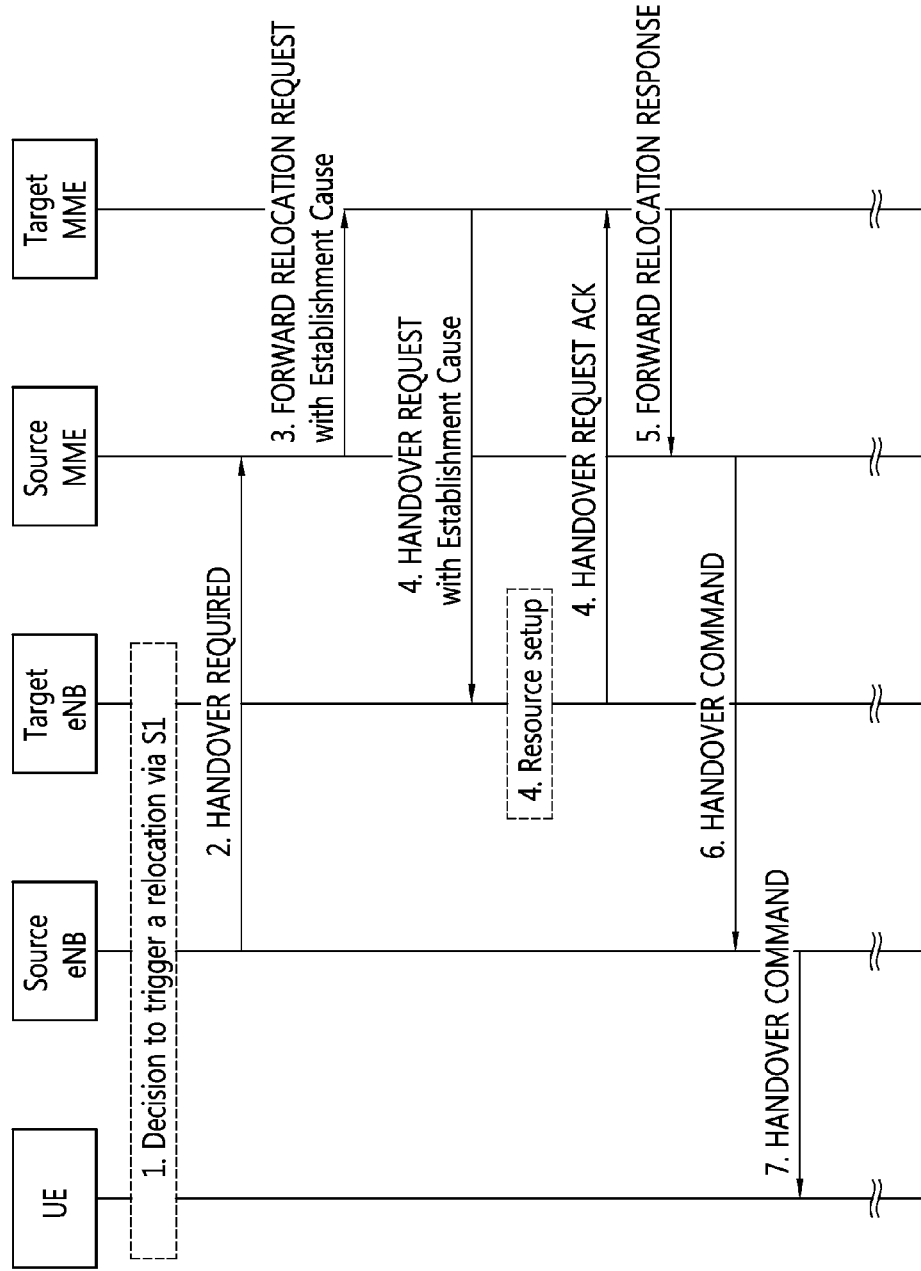
FIG. 8 shows an example of a method of transmitting an establishment cause according to an embodiment of the present invention.

FIG. 8 shows an example of a method of transmitting an establishment cause according to an embodiment of the present invention. FIG. 8 shows the proposed method in the S1 based handover procedure.

1. The source eNB decides to initiate an S1-based handover to the target eNB.

2. The source eNB transmits a handover required message to the source MME. The handover required message may include direct forwarding path availability, source to target transparent container, target eNB identity, closes subscriber group (CSG) identity (ID), CSG access mode, target tracking area identity (TAI), S1AP cause. The source eNB indicates which bearers are subject to data forwarding.

3. The source MME selects the target MME and if it has determined to relocate the MME, it transmits a forward relocation request message to the target MME. The forward relocation request message may include MME UE context, source to target transparent container, radio access network (RAN) cause, target eNB identity, CSG ID, CSG membership indication, target TAI, MS info change reporting action (if available), CSG information reporting action (if available), UE time zone, direct forwarding flag. The target TAI is transmitted to the target MME to help it to determine whether S-GW relocation is needed.

The forward relocation request message may further include the establishment cause of the UE. The establishment cause of the UE may be the EstablishmentCause field in the RRC connection request message in Table 1 above. That is, the EstablishmentCause field in the RRC connection request message may be included in the forward relocation request message. Accordingly, the establishment cause for the UE, which is one of emergency, high priority access, mt-access, mo-signaling, mo-data, and delay tolerant access, may be indicated.

In addition, the establishment cause for a machine type communication (MTC) device may be included in the establishment cause in the forward relocation request message. The MTC establishment cause may use reserved values (spare1, spare2) of the in the EstablishmentCause field. The MTC establishment cause may consist of MTC device access priority, MTC mobile terminated access, MTC mobile oriented signaling, and MTC mobile oriented data.

4. The target MME transmits a handover request message to the target eNB. The handover request message may include EPS bearers to setup, AMBR, S1AP cause, source to target transparent container, CSG ID, CSG membership indication, handover restriction list. This message creates the UE context in the target eNB, including information about the bearers, and the security context. For each EPS bearer, the bearers to setup includes S-GW address and uplink TEID for user plane, and EPS Bearer quality of service (QoS). If the direct forwarding flag indicates unavailability of direct forwarding and the target MME knows that there is no indirect data forwarding connectivity between source and target, the bearers to setup shall include "Data forwarding not possible" indication for each EPS bearer. Handover restriction list is transmitted if available in the target MME.

The handover request message may further include the establishment cause of the UE. The establishment cause of the UE may be the EstablishmentCause field in the RRC connection request message in Table 1 above. That is, the EstablishmentCause field in the RRC connection request message may be included in the handover request message. Accordingly, the target eNB may obtain the establishment cause of the UE.

In addition, the establishment cause for an MTC device may be included in the establishment cause in the forward relocation request message. The MTC establishment cause may use reserved values (spare1, spare2) of the in the EstablishmentCause field. The MTC establishment cause may consist of MTC device access priority, MTC mobile terminated access, MTC mobile oriented signaling, and MTC mobile oriented data.

5. The target MME transmits a forward relocation response message to the source MME. The forward relocation response message may include cause, target to source transparent container, S-GW change indication, EPS bearer setup list, addresses and TEIDs. For indirect forwarding, this message includes S-GW address and TEIDs for indirect forwarding (source or target). S-GW change indication indicates a new S-GW has been selected.

6. The source MME transmits a handover command message to the source eNB. The handover command message may include target to source transparent container, bearers subject to forwarding, bearers to release. The bearers subject to forwarding includes list of addresses and TEIDs allocated for forwarding. The bearers to release includes the list of bearers to be released.

7. The handover command message is constructed using the target to source transparent container and is transmitted to the UE. Upon reception of this message, the UE will remove any EPS bearers for which it did not receive the corresponding EPS radio bearers in the target cell.

Figure 9:
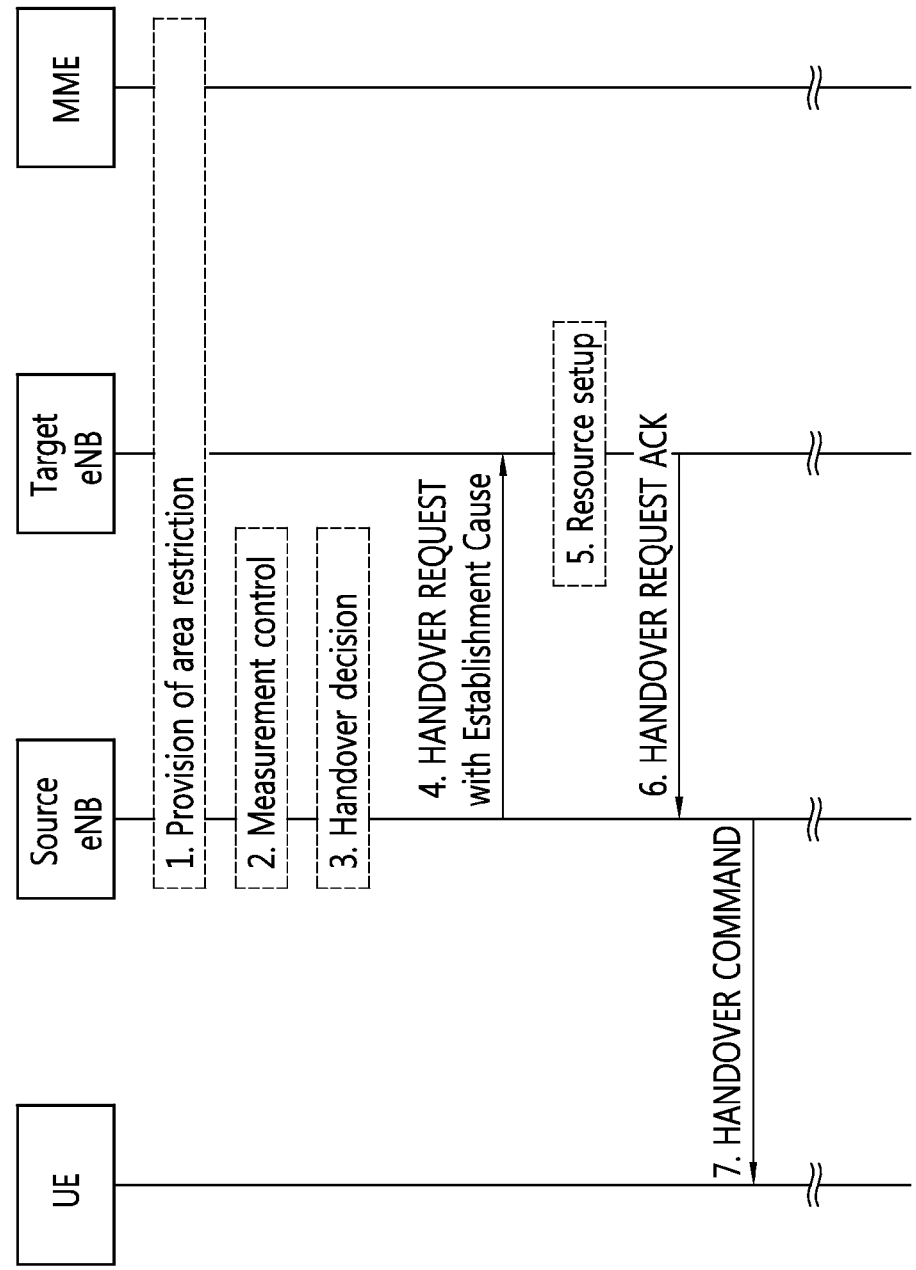
FIG. 9 shows another example of a method of transmitting an establishment cause according to an embodiment of the present invention.

FIG. 9 shows another example of a method of transmitting an establishment cause according to an embodiment of the present invention. FIG. 9 shows the proposed method in the X2 based handover procedure.

1. Area restriction information is provided. The UE context within the source eNB contains information regarding roaming restrictions which where provided either at connection establishment or at the last timing advance (TA) update.

2. The source eNB configures the UE measurement procedures according to the area restriction information, and transmits a measurement control message to the UE through L3 signaling. The UE transmits measurement reports by the rules set by i.e. system information, specification etc to the source eNB through L3 signaling. Measurements provided by the source eNB may assist the function controlling the UE's connection mobility. Meanwhile, the packet data is exchanged between the UE and the source eNB, or between the source eNB and the serving gateway.

3. The source eNB makes handover decision based on the measurement reports and radio resource management (RRM) information.

4. The source eNB transmits a handover request message through L3 signaling to the target eNB passing necessary information to prepare the handover procedure at the target side. UE X2/UE S1 signaling references enable the target eNB to address the source eNB and the EPC. The evolved radio access bearer (E-RAB) context includes necessary radio network layer (RNL) and transport network layer (TNL) addressing information, and quality of service (QoS) profiles of the E-RABs.

The handover request message may include the establishment cause of the UE. The establishment cause of the UE may be the EstablishmentCause field in the RRC connection request message in Table 1 above. That is, the EstablishmentCause field in the RRC connection request message may be included in the handover request message. Accordingly, the target eNB may obtain the establishment cause of the UE.

In addition, the establishment cause for an MTC device may be included in the establishment cause in the forward relocation request message. The MTC establishment cause may use reserved values (spare1, spare2) of the in the EstablishmentCause field. The MTC establishment cause may consist of MTC device access priority, MTC mobile terminated access, MTC mobile oriented signaling, and MTC mobile oriented data.

5. The target eNB performs a resource setup.

6. The target eNB transmits a handover request acknowledge message to the source eNB through L3 signaling, and prepares the handover. The handover request acknowledge message may include a transparent container to be sent to the UE as an RRC message to perform the handover. The transparent container may include a new C-RNTI, target eNB security algorithm identifiers for the selected security algorithms, a dedicated RACH preamble, and possibly some other parameters i.e. access parameters, SIBs, etc. The handover request acknowledge message may also include RNL/TNL information for the forwarding tunnels, if necessary. Meanwhile, as soon as the source eNB receives the handover request acknowledge message, or as soon as the transmission of the handover command is initiated in the downlink, data forwarding may be initiated.

7. The source eNB transmits a handover command message to the UE.

According to the handover procedure described above, the target eNB receives the necessary information for the UE through the handover request message in S1/X2 based handover procedure. Also, in case of S1 based handover procedure, the target MME get that information through the forward relocation request message from the source MME.

Figure 10:
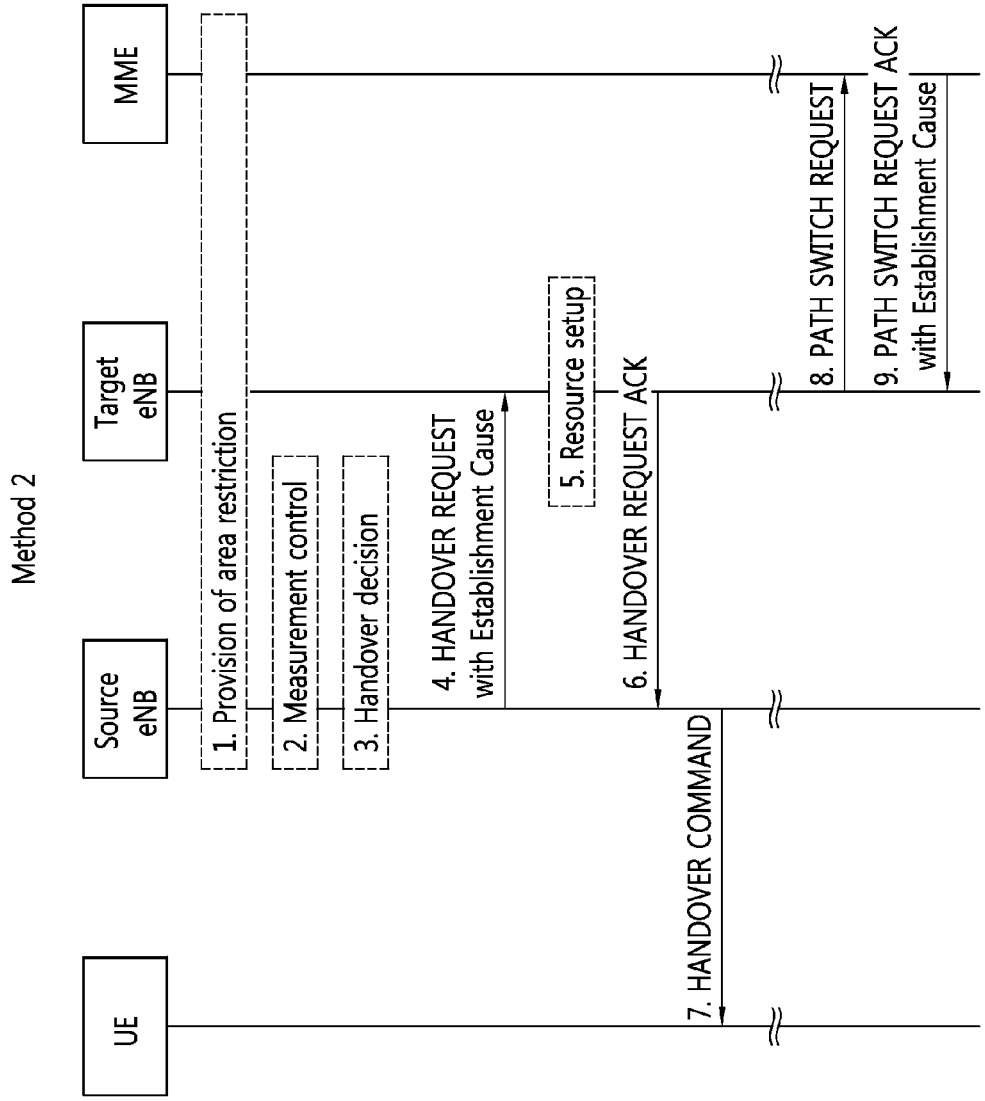
FIG. 10 shows another example of a method of transmitting an establishment cause according to an embodiment of the present invention.

FIG. 10 shows another example of a method of transmitting an establishment cause according to an embodiment of the present invention. FIG. 10 shows the proposed method in the X2 based handover procedure.

1. Area restriction information is provided. The UE context within the source eNB contains information regarding roaming restrictions which where provided either at connection establishment or at the last timing advance (TA) update.

2. The source eNB configures the UE measurement procedures according to the area restriction information, and transmits a measurement control message to the UE through L3 signaling. The UE transmits measurement reports by the rules set by i.e. system information, specification etc to the source eNB through L3 signaling. Measurements provided by the source eNB may assist the function controlling the UE's connection mobility. Meanwhile, the packet data is exchanged between the UE and the source eNB, or between the source eNB and the serving gateway.

3. The source eNB makes handover decision based on the measurement reports and radio resource management (RRM) information.

4. The source eNB transmits a handover request message through L3 signaling to the target eNB passing necessary information to prepare the handover procedure at the target side. UE X2/UE S1 signaling references enable the target eNB to address the source eNB and the EPC. The evolved radio access bearer (E-RAB) context includes necessary radio network layer (RNL) and transport network layer (TNL) addressing information, and quality of service (QoS) profiles of the E-RABs.

5. The target eNB performs a resource setup.

6. The target eNB transmits a handover request acknowledge message to the source eNB through L3 signaling, and prepares the handover. The handover request acknowledge message may include a transparent container to be sent to the UE as an RRC message to perform the handover. The transparent container may include a new C-RNTI, target eNB security algorithm identifiers for the selected security algorithms, a dedicated RACH preamble, and possibly some other parameters i.e. access parameters, SIBs, etc. The handover request acknowledge message may also include RNL/TNL information for the forwarding tunnels, if necessary. Meanwhile, as soon as the source eNB receives the handover request acknowledge message, or as soon as the transmission of the handover command is initiated in the downlink, data forwarding may be initiated.

7. The source eNB transmits a handover command message to the UE.

According to the handover procedure described above, the target eNB receives the necessary information for the UE through the handover request message in S1/X2 based handover procedure. Also, in case of S1 based handover procedure, the target MME get that information through the forward relocation request message from the source MME.

8. The target eNB transmits a path switch request message to the MME to inform that the UE has changed cell.

9. The MME transmits a path switch request acknowledge message to the target eNB to confirm the path switch request message.

The packet switch acknowledge message may include the establishment cause of the UE. The establishment cause of the UE may be the EstablishmentCause field in the RRC connection request message in Table 1 above. That is, the EstablishmentCause field in the RRC connection request message may be included in the handover request message. Accordingly, the target eNB may obtain the establishment cause of the UE.

In addition, the establishment cause for an MTC device may be included in the establishment cause in the forward relocation request message. The MTC establishment cause may use reserved values (spare1, spare2) of the in the EstablishmentCause field. The MTC establishment cause may consist of MTC device access priority, MTC mobile terminated access, MTC mobile oriented signaling, and MTC mobile oriented data.

Figure 11:
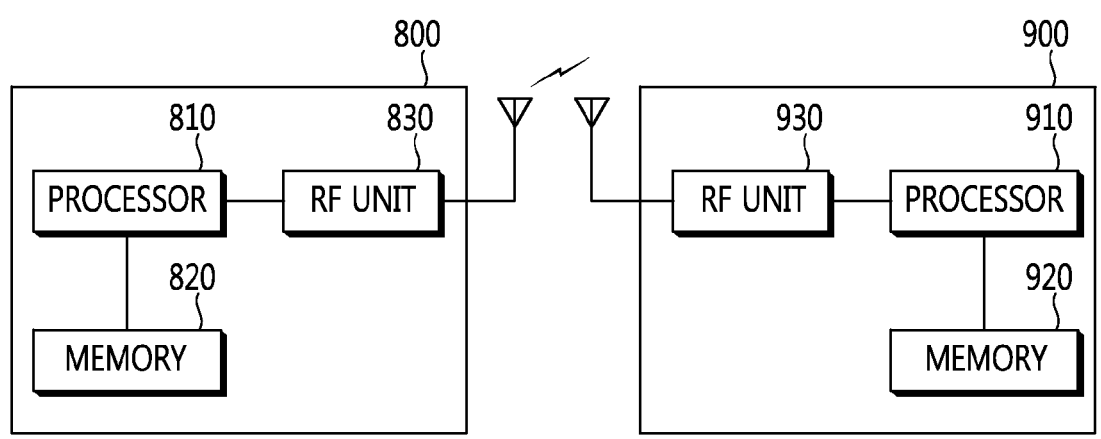
FIG. 11 is a block diagram showing wireless communication system to implement an embodiment of the present invention.

FIG. 11 is a block diagram showing wireless communication system to implement an embodiment of the present invention.

A HeNB 800 includes a processor 810, a memory 820, and an RF (radio frequency) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A MME 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method of performing a handover procedure, by a target base station, in a wireless communication system, the method comprising:
   receiving, from a source base station, a handover request message including a radio resource control (RRC) connection request message, wherein the RRC connection request message includes a specific establishment cause of a user equipment (UE), a UE-Identity field indicating a UE identity facilitating contention resolution, and a Random Value field indicating an integer value, wherein the specific establishment cause among a plurality of establishment causes includes emergency, high priority access, mobile terminated access, mobile oriented signaling, mobile oriented data, and delay tolerant access; and
   transmitting, to the UE, a handover command message.

2. The method of claim 1, wherein the handover request message is received from the source base station during an X2 interface based handover procedure.

3. The method of claim 1, wherein the plurality of establishment causes include at least one of a machine type communication (MTC) device access priority, MTC mobile terminated access, MTC mobile oriented signaling, or MTC mobile oriented data.

4. The method of claim 1, further comprising:
   transmitting, to the source base station, a handover request acknowledge message including a transparent container, wherein the transparent container includes a new cell-radio network temporary identifier (C-RNTI), security algorithm identifiers of the target base station, a dedicated random access channel (RACH) preamble, and system information blocks (SIBs).

5. A target base station in a wireless communication system:
   a radio frequency (RF) unit for transmitting or receiving a radio signal; and
   a processor, operatively coupled to the RF unit and configured to:
      receive, from a source base station, a handover request message including a radio resource control (RRC) connection request message, wherein the RRC connection request message includes a specific establishment cause of a user equipment (UE), a UE-Identity field indicating a UE identity facilitating contention resolution, and a Random Value field indicating an integer value, wherein the specific establishment cause among a plurality of establishment causes includes emergency, high priority access, mobile terminated access, mobile oriented signaling, mobile oriented data, and delay tolerant access; and
      transmit, to the UE, a handover command message.

6. The target base station of claim 5, wherein the handover request message is received from the source base station during an X2 interface based handover procedure.

7. The target base station of claim 5, wherein the plurality of establishment causes include at least one of a machine type communication (MTC) device access priority, MTC mobile terminated access, MTC mobile oriented signaling, or MTC mobile oriented data.

8. The target base station of claim 5, wherein the processor is further configured to:
   transmit, to the source base station, a handover request acknowledge message including a transparent container, wherein the transparent container includes a new cell-radio network temporary identifier (C-RNTI), security algorithm identifiers of the target base station, a dedicated random access channel (RACH) preamble, and system information blocks (SIBs).

* * * * *